United States Patent [19]

Lafser, Jr.

[11] Patent Number: 5,086,716

[45] Date of Patent: Feb. 11, 1992

[54] SYSTEM, APPARATUS AND METHOD FOR DISPOSING OF SOLID WASTE

[75] Inventor: Fred A. Lafser, Jr., University City, Mo.

[73] Assignee: Industrial Waste Management, Inc., St. Louis, Mo.

[21] Appl. No.: 516,210

[22] Filed: Apr. 30, 1990

[51] Int. Cl.$^5$ ............................................... F23G 7/04
[52] U.S. Cl. ................................. 110/345; 110/346; 110/246; 432/14; 432/106
[58] Field of Search ...................... 110/246, 346, 345; 432/106, 14

[56] References Cited

U.S. PATENT DOCUMENTS

| | | | |
|---|---|---|---|
| 4,315,712 | 2/1982 | Seglias | 110/346 |
| 4,619,605 | 10/1986 | Herchenbach et al. | 432/106 |
| 4,640,681 | 2/1987 | Steinbiss et al. | 432/106 |
| 4,648,333 | 3/1987 | Mudd et al. | 110/346 |
| 4,658,736 | 4/1987 | Walter | 110/246 |
| 4,850,290 | 7/1989 | Benoit et al. | 110/246 |

*Primary Examiner*—Henry C. Yuen
*Attorney, Agent, or Firm*—Senniger, Powers, Leavitt & Roedel

[57] ABSTRACT

A system for disposing of solid waste which recovers a portion of the energy and materials value of the waste. The system includes a plurality of sealable containers for the solid waste, and a rotary kiln. An air cannon propels the containers into the vessel on a trajectory generally parallel to the axis of the vessel. The kiln is of the type including a cylindrical vessel containing materials to be processed therein. The vessel has first and second longitudinally opposite ends, and rotates about its longitudinal axis. A burner heats gases in the interior of the vessel for processing the material in the vessel. The temperature in the vessel progressively increases from the first end to the second end of the kiln.

6 Claims, 1 Drawing Sheet

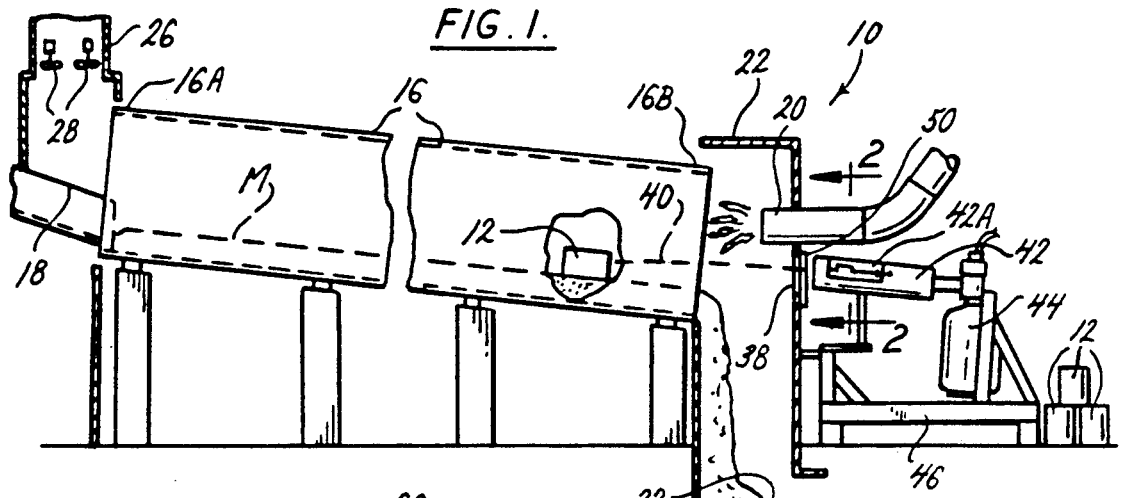
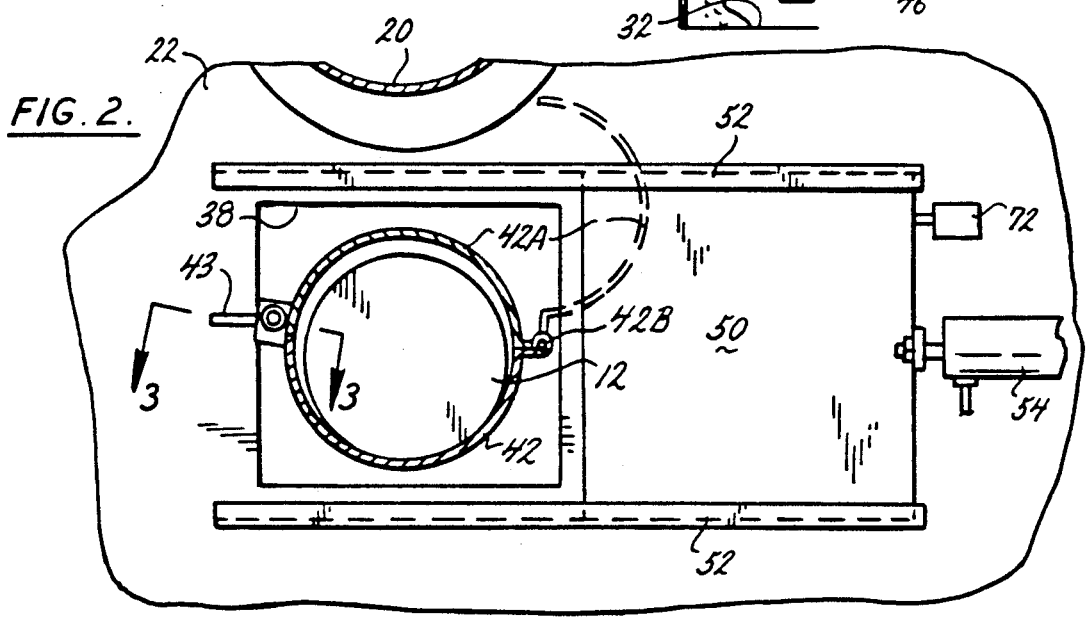
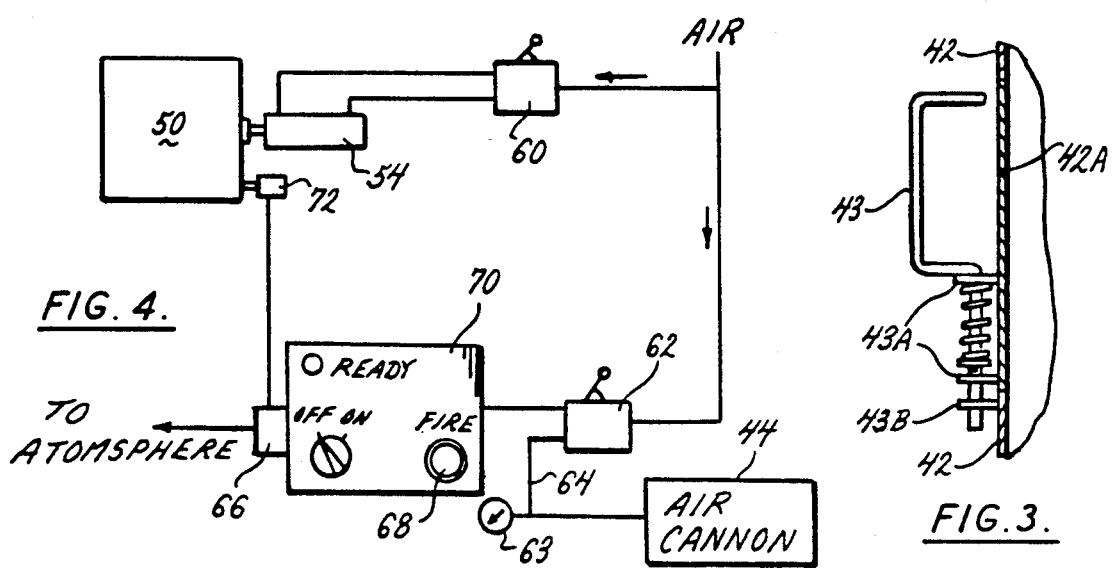

SYSTEM, APPARATUS AND METHOD FOR DISPOSING OF SOLID WASTE

BACKGROUND OF THE INVENTION

This invention relates generally to the disposal of solid wastes and more particularly to the disposal of solid wastes in a rotary kiln.

As is known, many solid wastes may be disposed of by burning in a rotary cement kiln. Of particular importance is that the use of a cement kiln generally satisfies federal and state disposal regulations for solid hazardous waste and other regulated solid waste. The high temperatures developed in the kiln and the long exposure of the waste in the kiln to these elevated temperatures results in destruction of the organic components of the waste. The inorganic components of the waste combine with the active compounds of the cement, rendering them nonhazardous and recovering their material value in making a useful product. Further, the burning of combustible solid wastes can supply a portion of the energy requirement of the kiln for production of cement. Within certain limits, the introduction of the waste has no adverse affect on the quality of the cement produced by the kiln.

Briefly described, a typical rotary cement kiln includes a long (i.e., 200-600 ft.) cylindrical vessel which is inclined slightly from the horizontal. The vessel is approximately 9-20 ft. in diameter and is rotated slowly (about 1-3 revolutions per minute) about its axis. A mixture of finely ground cement raw materials is fed into the vessel at its elevated end. The materials travel slowly along the length of the vessel from the upper end to the lower end. A stream of heated gas is forced through the vessel from the lower end to the upper end, opposite the direction of flow of the mixture The gas temperature in the vessel is hottest at the lower end of the vessel and coolest at the upper end of the vessel. The thermal energy of the gases in the vessel drives the chemical reactions which convert the cement raw materials to cement clinker. In some cement kilns, solid fuel may be mixed with the raw materials. This fuel may provide additional thermal energy for the chemical reactions by combusting at a point along the length of the vessel where the gas temperature is sufficiently high. The intermixing of the solid fuel with the cement raw materials is believed to enhance the efficiency of the transfer of heat from the combusting solid fuel to the raw materials. There are other types of cement kilns, including those which have separate vessels for preheating or precalcining the cement raw materials. Reference is made to U.S. Pat. No. 4,022,629 and the references cited therein for a more detailed discussion of rotary cement kilns.

An example of a method and apparatus for disposal of solid hazardous wastes is shown in U.S. Pat. No. 4,850,290 (Benoit et al.). In Benoit et al., solid hazardous wastes are packaged in sealable steel pails or drums for transportation to the kiln. The waste in the containers preferably has an energy value of greater than 5.000 BTU/lb for any appreciable recovery of energy value in the kiln. Benoit et al. specifically call for introduction of the containerized solid waste to the kiln at a point along the length of the kiln where the gas temperature is between 950° and 1200° C., and preferably between 950° and 1100° C. These temperatures generally correspond to the calcining zone of the kiln in which calcium is freed for later recombination with components of other raw materials. This zone corresponds to approximately the central one third of the length of the kiln, assuming there is no preheating or precalcining of the raw materials prior to their introduction into the vessel. At a temperature range of approximately 1300° to 1600° C., the calcium released in the calcining zone recombines with other components of the raw materials to form cement clinker. According to Benoit et al., the hazardous waste should not be charged to the clinkering zone of the kiln because its introduction produces reducing rather than oxidizing conditions which adversely affects cement quality.

Benoit et al. provide a port in the side wall of the rotating, cylindrical vessel of the kiln, and a drop tube extending through the port for guiding containers of hazardous solid waste into the vessel. Because the drop tube is attached to and extends into the vessel, a special temperature resistant alloy must be employed in the construction of the tube. The portion of the tube inside the vessel must be covered by refractory material. The containers are raised up to the level of the drop tube and loaded into the portion of the tube outside the vessel as it passes by. In a second embodiment, the drop tube has two portions, a stationary vertical portion outside the kiln, and a portion inside the kiln which rotates with the kiln. The containers are charged to the kiln when the tube portions align. A cam operated door covers the port until the drop tube reaches a vertical (or aligned) position, at which time the door opens and the container drops into the vessel. Thus, the rate of charging containers to the vessel is limited by the rotational speed of the vessel.

SUMMARY OF THE INVENTION

Among the several objects of the present invention may be noted the provision of a system for disposal of solid waste in which the solid waste is loaded into sealable containers for transportation and handling; the provision of such a system in which the containerized waste is delivered axially into a rotary kiln; the provision of such a system which delivers the containerized waste to the clinkering zone of the rotary kiln; the provision of such a system in which at least a portion of the thermal energy of the waste is absorbed in chemical reactions for processing material in the kiln; the provision of such a system in which a portion of the material value of the waste is recovered in making a useful product; the provision of such a system in which the components for delivery of the waste into the kiln are protected from continuous exposure to the high temperatures of the kiln interior; the provision of such a system which allows flexibility as to the frequency of delivery of containers of waste into the kiln; and the provision of such a system which requires little modification to an existing rotary kiln and is, thus, relatively inexpensive.

It is also among the objects of the present invention may be noted the provision of apparatus, including a rotary kiln, for disposal of containerized solid waste which delivers the waste into the rotary kiln; the provision of such apparatus which delivers the containerized waste to the clinkering zone of the rotary kiln; the provision of such apparatus in which the components for delivery of the waste into the kiln are protected from continuous exposure to the high temperatures of the kiln interior; the provision of such apparatus which allows flexibility as to the frequency of delivery of containers of waste to the interior of the kiln; and the provision of such apparatus which is relatively inexpensive.

Still further among the several objects of the present invention may be noted the provision of a method for disposing of solid waste in the clinkering zone of a rotary kiln; the provision of such a method in which the at least a portion of the thermal energy of the waste is absorbed in chemical reactions for processing materials in the kiln; the provision of such a method in which a portion of the material value of the waste is recovered in making a useful product; the provision of such a method which is easily carried out by a single operator; and the provision of such a method which is relatively inexpensive and requires a minimal modification to an existing kiln.

Generally, a system for disposal of solid waste comprising a plurality of sealable containers for the waste and a rotary kiln. The kiln includes a generally cylindrical vessel containing materials to be processed therein. The vessel has a first and second longitudinally opposite ends and is adapted for rotation about its longitudinal axis. Means is provided to heat gases in the interior of the vessel to progressively higher temperatures from one end to the other end of the vessel for processing the material in the vessel. Means propels the containers into the vessel on a trajectory generally parallel to the axis of the vessel.

In another aspect of the present invention, apparatus for disposing of solid waste pre-packaged in sealed containers comprises a rotary kiln of the type described above. Means propels the containers through the port and into the vessel on a trajectory generally parallel to the axis of the vessel.

In still another aspect of the present invention, a method for disposing of solid waste pre-packaged in sealed containers involves delivery of the containers and waste therein into a rotary kiln, of the type described above. More specifically, the method comprises delivering the containers of waste to a point inside the kiln where the gas temperature is at least about 1200° C.

Other objects and features will be in part apparent and in part pointed out hereinafter.

BRIEF DESCRIPTION OF THE DRAWINGS

FIG. 1 shows an elevation of the system of the present invention;

FIG. 2 is a view taken in the plane including line 2—2 of FIG. 1 and showing a port in the kiln, a door which is adapted to cover the port, and a barrel which is part of an air cannon for propelling a container of waste into the kiln;

FIG. 3 is a fragmentary section taken in the plane including line 3—3 of FIG. 2; and FIG. 4 is a schematic diagram of an interlock for the door and firing mechanism of the air cannon.

Corresponding reference characters indicate corresponding parts throughout the several views of the drawings.

DETAILED DESCRIPTION OF A PREFERRED EMBODIMENT

Many solid wastes produced by industry are deemed hazardous because of their toxicity and/or flammability. Such hazardous waste includes, for example, infectious hospital waste, ink sludges, paint sludges and paint filters. The disposal of these hazardous wastes is regulated by law, which specifies or limits the ways in which the waste may be transported and disposed. A system for disposing of solid waste of the present invention, indicated generally at 10 in the drawings, provides an environmentally safe way of disposing of many such solid hazardous wastes which makes use of some of the energy value and material value of the waste to produce useful materials. However, the system may also be beneficially used in the disposal of other types of solid waste, such as nonhazardous plastics, sealants and other energy bearing solid waste. These materials typically have energy values in excess of 5,000 BTU/lb, which is approximately the minimum energy value of waste at which any significant recovery of the waste energy may be had. Therefore, the waste disposed of using the system 10, or at least the mixture of wastes disposed of in the system should have an energy value no less than 5,000 BTU/lb.

The system 10 comprises a plurality of containers 12 for the solid waste and a rotary kiln 14. As will be explained more fully below, the containers 12 are delivered to a point inside the kiln 14 where the gas temperature in the kiln is approximately between 1200° and 1925° C., where both the container and the waste are burned. The rotary kiln 14 illustrated in FIG. 1 is a typical rotary cement kiln. However, it is to be understood that other types of cement kilns, as well as rotary kilns for other types of products, such as lime, lightweight aggregate and asphalt, may be used in the present invention. The kiln 14 includes a long cylindrical vessel 16 made of a heat resistant alloy which is lined with refractory material on the inside. The vessel 16 is inclined slightly from the horizontal and adapted for rotation about its longitudinal axis. In this embodiment, the vessel 16 contains the raw materials M for cement which are processed in the vessel into cement clinker. The raw materials typically include calcium oxide, aluminum oxide, silicon oxide and ferric oxide. The materials are charged through a chute 18 to an upper (first) end 16A of the vessel and slowly travel down to its lower (second) end 16B as the vessel rotates about its longitudinal axis at a selected rate in the range of approximately one to three times per minute.

The interior of the vessel 16 is heated by a burner 20 mounted on a hood 22 covering the open lower end 16B of the vessel. The gases in the vessel 16 are driven through the vessel from the lower end 16B to the upper end and out a stack 26 by blowers 28 in the stack. Sensors (not shown) in the stack 26 monitor the effluents. The gas temperature progressively increases from the upper end 16A to the lower end 16B of the vessel. The temperature in the middle portion of the vessel ranges from approximately 950° to 1200° C., and the temperature near the lower end 16B of the vessel ranges from approximately 1200° to 1925° C. These temperature ranges approximately correspond to the calcining zone and clinkering zone of the kiln 14, respectively. Calcium is released from the calcium oxide in the calcining zone, and is then combined with components of the other raw materials (e.g., aluminum, silica, iron) in the clinkering zone to form cement compounds. The clinker produced in the clinkering zone then exits the vessel 16 at its lower end 16B and falls down into a pit 32 for cooling.

In some kilns, additional thermal energy is provided by combustion of solid fuels, which are mixed with the raw materials before they are introduced into the vessel 16. Because the fuels are intermixed with the raw materials, it is believed that the efficiency of the transfer of energy to the raw materials for the calcining and/or clinkering reactions is enhanced. This allows the amount of fuel used in the burner to be reduced. In the same way, solid waste which is charged into the material in the vessel 16 can provide a portion of the thermal energy required for the chemical reactions as it combusts and releases its thermal energy.

It is believed that the introduction of the containerized waste in the clinkering zone near the lower end 16B of the vessel maximizes recovery of its energy value. The thermal energy requirements for the chemical reactions in the clinkering zone are the highest of anywhere in the vessel 16. Introduction of the waste to the vessel upstream (with respect to the flow of material through the vessel) of the clinkering zone still leaves to the burner 20 the job of supplying the higher thermal energy required in the clinkering zone. In the present system 10, which delivers containerized solid waste to the clinkering zone of the vessel 16, it is possible to reduce the fuel combusted by the burner 20 on a ratio of nearly one to one with the waste delivered into the clinkering zone of the vessel 16. However, it is believed that the maximum amount of fuel by weight which may be provided by burning the waste is about 10% to 20% of the total kiln requirements. The introduction of waste, particularly hazardous waste, at a point in the vessel where the temperatures are lower than those experienced in the clinkering zone, may not result in destruction of all of the organics. For complete incineration of organic materials the temperature should exceed about 1200° C. Although the gas temperature increases as the material and waste flows toward the lower end 16B of the vessel, the residence times of volatile organics in a temperature zone high enough to destroy them may be too short.

The containers 12 of the system are cylindrical pails preferably made of combustible plastic material for quick disintegration in the kiln 14. In this embodiment the containers 12 are five gallon pails of the type commonly used in industry for packaging paint, roof tar and other products. The waste is loaded into the containers which are sealed for transportation to the site of the rotary kiln 14. As previously stated, the waste is solid. The existence of a significant amount of free liquid waste is to be avoided. The rapid combustion of containerized liquids in the kiln 14 can suddenly deplete oxygen, resulting in emission of pollutants through the stack 26, and adverse effects on cement quality. It is to be understood that the containers 12 may be made of materials other than plastic and still fall within the scope of the present invention.

Means, comprising in this embodiment an air cannon indicated generally at 36, is provided for propelling one of the containers 12 through a port 38, located in the hood 22 below the burner 20, and into the vessel 16 on a trajectory 40 generally parallel to the axis of the vessel. The air cannon 36 has a steel barrel 42 adapted to receive one of the containers 12. The air cannon further includes a device 44 for the storage and instantaneous release of compressed air. This device is the model ABS-4-10 Air Blaster made by Vibco, Inc. of Wyoming, R.I. The device 44 is of the type which is normally attached to a bin (not shown) for applying a blast of high pressure air to the materials in the bin to release materials adhering to the walls of the bin. The device 44 has been modified by the addition of the barrel 42 on the output end. In this embodiment, the device 44 stores compressed air, which is later released for transferring its stored kinetic energy to the container. Other means for storing energy for later transfer to the container 12, such as a spring, may also be used. The device 44 and the barrel 42 are mounted on a frame 46 and positioned with the mouth of the barrel adjacent the port 38 in the hood 22 generally at the lower end 16B of the vessel.

The device 44 must be powerful enough to propel the container 12 over the pit 32 and sufficiently far up the length of the vessel 16 to assure exposure of the waste to high temperature long enough for complete combustion of the organics and combination of the inorganics with components of the cement raw materials. However, the device should not be so powerful that the containers are propelled beyond the upper end of the clinkering zone where the gas temperature in the vessel 16 falls below about 1200°. Of course, the size of the device 44 will depend upon the weight of the container 12 and the distance it must be propelled. The air cannon 36 of the present system 10 shoots a container 12 loaded with 25 to 30 pounds of waste in the range of about 50 to 100 feet.

As shown in FIG. 2, a portion of the side wall of the barrel 42 has been cut away to define a hatch 42A pivotally mounted by hinges 42B to the remainder of the barrel. The hatch 42A may swing on its hinges 42B between an open position in which one of the containers 12 may be loaded into the barrel 42, and a closed position in which the air cannon 36 may be discharged for propelling the container through the port 38 and into the vessel 16 on a trajectory 40 which is parallel to the axis of the vessel. As best seen in FIG. 3, a spring biased pin 43 supported by lugs 43A on the hatch 42A is received through a lug 43B on the barrel 42 to lock the hatch in the closed position. The diameter of the barrel 42 is about one inch greater than the diameter of the containers 12. It has been found that this provides for easy loading of one of the containers into the barrel 42, but allows the container to sufficiently obstruct the barrel so that firing of the air cannon 36 imparts a force to the container to propel it sufficiently far into the vessel 16.

Because the air cannon 36 is not attached to the kiln 14, none of the heat of the kiln is transferred by conduction to the air cannon. In addition, the air cannon 36 is not exposed to heat from the kiln 14 through the port 38 for extended periods because a door 50 covers the port except when the air cannon is fired. Therefore, although the material out of which the barrel 42 is formed must be heat resistant, no special heat resistant alloys are required. The frequency with which containers 12 are charged to the vessel 16 is not limited by the rotational speed of the vessel, allowing considerable flexibility in the operation. Typically, one container loaded with 25-30 pounds of waste is delivered into the vessel per minute. However, frequencies of three containers per minute have been achieved. The design of the present system 10 requires little modification of an existing rotary kiln 14 for solid waste disposal, and therefore is relatively inexpensive.

As may be seen in FIG. 2, the door 50 is slidably mounted on a pair of tracks 52 attached to the hood 22. A cylinder 54 is adapted to selectively move the door 50 laterally of the hood 22 between a closed position in which the door covers the port 38 (FIG. 1), and an open position in which the port is uncovered (FIG. 2). The door 50 and the air cannon 36 are interlocked such that the air cannon cannot discharge the container 12 except when the port 38 is uncovered.

A schematic diagram of the interlock feature is shown in FIG. 4. Compressed air is supplied to a door control mechanism 60, and to the air cannon recharging control 62. By throwing the lever on the recharging control 62, compressed air is supplied through line 64 to the air cannon 36 for recharging it after firing. The cannon is charged to approximately 100-110 psi, which is indicated on pressure gauge 63. In order to fire the air cannon 36, the air line 64 is vented through a solenoid valve 66. The solenoid valve 66 is opened by depressing a button 68 on the fire control panel 70. However, the button 68 is inoperable to open the solenoid valve 66 except when the valve is energized. Energization of the solenoid valve 66 is controlled by a switch 72 adjacent the kiln door 50. When the door 50 is opened by manipulation of the lever on the door control mechanism 60, the switch 72 is tripped and the solenoid valve 66 is energized. The "ready" light on the fire control panel 70 lights up to reflect the energization of the solenoid valve. Thereafter, the solenoid valve 66 may be opened by depressing the button 68 to fire the air cannon 36. Closing the door 50 again trips the switch 72 and the solenoid valve 66 is de-energized. Thus, the air cannon 36 will not fire unless the door 50 is opened, thereby providing safety for the operator and reducing the chance of spillage of the waste. The on/off control on the panel 70 is operable to shut down the interlock so that the air cannon 36 may not be fired regardless of the door position.

The apparatus for disposal of pre-packaged solid waste of the present invention includes the kiln 14 and air cannon 36 as described above.

The method of the present invention involves loading solid waste into the plastic containers 12, and transporting the sealed containers to the site of the rotary kiln 14. There the containers 12 are loaded into the air cannon 36, as described above, for delivery to a point along the length of the vessel 16, shown by the position of the container 12 inside the vessel in FIG. 1, where the gas temperature is generally between 1200° and 1925° C. More generally, the containers 12 are delivered to the point in the vessel 16 where the clinkering reactions occur. Quality control monitoring of cement produced in a cement kiln used for solid waste disposal has discovered no adverse effects on the cement as a result of delivery of waste into the clinkering zone.

The step of delivering the containers 12 comprises propelling the containers on a trajectory 40 generally parallel to the axis of the vessel 16 through a port 38 in an end of the kiln 14. Propulsion of the containers 12 in this manner is accomplished by provision of the air cannon 36, described above. In operation, the hatch 42A on the air cannon 36 is opened and one of the containers 12 is loaded therein with its axis parallel to the axis of the barrel 42. The hatch 42A is then closed and locked. The door 50 is then opened and the air cannon 36 is triggered by depressing button 68 to propel the container 12 through the port 38, over the pit 32 and into the vessel 16. A single operator may carry out the loading and firing sequence.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A method for disposing of solid waste in a rotary kiln of the type which produces cement, the kiln comprising a rotating, generally cylindrical vessel having first and second longitudinally opposite ends and means for heating gases in the interior of the vessel to progressively greater temperatures from one end to the other end for processing material in the vessel, the interior of the kiln including at least two zones, a calcining zone wherein the temperature ranges from approximately 950° C. to 1200° C. and a clinkering zone wherein the temperature ranges from above 1200° C. to approximately 1925° C., the method comprising the step of delivering pre-packaged sealed containers of solid waste to the clinkering zone inside the vessel.

2. A method as set forth in claim 1 wherein the step of delivering the containers comprises the step of propelling the containers a substantial distance horizontally into the vessel on a trajectory generally parallel to the longitudinal axis of the vessel.

3. A method as set forth in claim 1 wherein the rotary kiln is of the type which produces cement, the kiln having a port in one end, and wherein the step of delivering the containers comprises the steps of loading one of the containers in propelling means located generally adjacent the port, and triggering said propelling means thereby propelling the container out of said propelling means, through the port and to the clinkering zone of the vessel on a trajectory generally parallel to the axis of the vessel.

4. A method for disposing of solid waste in a rotary kiln of the type which produces cement, the kiln comprising a rotating, generally cylindrical vessel having first and second longitudinally opposite ends and means for heating gases in the interior of the vessel to progressively greater temperatures from one end to the other end for processing material in the vessel, the interior of the kiln including at least two zones, a calcining zone wherein the temperature ranges from approximately 950° C. to 1200° C. and a clinkering zone wherein the temperature ranges from above 1200° C. to approximately 1925° C., the method comprising the steps of packaging solid waste in sealable containers, and delivering the containers to the clinkering zone inside the vessel.

5. A method as set forth in claim 4 wherein the step of delivering the containers comprises the step of propelling the containers a substantial distance horizontally into the vessel on a trajectory generally parallel to the axis of the vessel.

6. A method as set forth in claim 4 wherein the rotary kiln is of the type which produces cement, the kiln having a port in one end, and wherein the step of delivering the containers comprises the steps of loading one of the containers in propelling means located generally adjacent the port, and triggering said propelling means thereby propelling the container out of said propelling means, through the port and to the clinkering zone of the vessel on a trajectory generally parallel to the axis of the vessel.

* * * * *

REEXAMINATION CERTIFICATE (2660th)

United States Patent [19]

Lafser, Jr.

[11] B 1 5,086,716
[45] Certificate Issued  Aug. 29, 1995

[54] SYSTEM, APPARATUS AND METHOD FOR DISPOSING OF SOLID WASTE

[75] Inventor: Fred A. Lafser, Jr., University City, Mo.

[73] Assignee: Perma-Fix Corporation

Reexamination Request:
No. 90/002,822, Aug. 28, 1992

Reexamination Certificate for:
Patent No.: 5,086,716
Issued: Feb. 11, 1992
Appl. No.: 516,210
Filed: Apr. 30, 1990

[51] Int. Cl.⁶ ............................................. F23G 7/04
[52] U.S. Cl. .................................. 110/345; 110/346; 110/246; 432/14; 432/106
[58] Field of Search ................ 110/345, 346, 246; 432/14, 106

[56] References Cited

U.S. PATENT DOCUMENTS

| | | | |
|---|---|---|---|
| 4,315,712 | 2/1982 | Seglias | 110/346 |
| 4,619,605 | 10/1986 | Herchenbach et al. | 432/106 |
| 4,646,681 | 2/1981 | Steinbiss et al. | 432/106 |
| 4,648,333 | 3/1987 | Mudd et al. | 110/346 |
| 4,658,736 | 4/1987 | Walter | 110/246 |
| 4,850,290 | 7/1989 | Benoit et al. | 110/246 |
| 4,984,983 | 1/1991 | Enkegaard | 432/14 |

*Primary Examiner*—Henry C. Yuen

[57] ABSTRACT

A system for disposing of solid waste which recovers a portion of the energy and materials value of the waste. The system includes a plurality of sealable containers for the solid waste, and a rotary kiln. An air cannon propels the containers into the vessel on a trajectory generally parallel to the axis of the vessel. The kiln is of the type including a cylindrical vessel containing materials to be processed therein. The vessel has first and second longitudinally opposite ends, and rotates about its longitudinal axis. A burner heats gases in the interior of the vessel for processing the material in the vessel. The temperature in the vessel progressively increases from the first end to the second end of the kiln.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3, 5 and 6 are cancelled.

Claims 1, 4 are determined to be patentable as amended.

New claim 7 is added and determined to be patentable.

1. A method for disposing of solid waste in a rotary kiln of the type which produces cement, the kiln comprising a rotating, generally cylindrical vessel having first and second longitudinally opposite ends, interior walls and means for heating gases in the interior of the vessel to progressively greater temperatures from one end to the other end for processing material in the vessel, the interior of the kiln including at least two zones, a calcining zone wherein the temperature ranges from approximately 950° C. to 1200° C. and a clinkering zone wherein the temperature ranges from above 1200° C. to approximately 1925° C., the method comprising the step of delivering pre-packaged sealed containers of solid waste to the clinkering zone inside the vessel where the gas temperature is in excess of 1700° C. *and less than approximately 1925° C.*

4. A method for disposing of solid waste in a rotary kiln of the type which produces cement, the kiln comprising a rotating, generally cylindrical vessel having first and second longitudinally opposite ends and means for heating gases in the interior of the vessel to progressively greater temperatures from one end to the other end for processing material in the vessel, the interior of the kiln including at least two zones, a calcining zone wherein the temperature ranges from approximately 950° C. to 1200° C. and a clinkering zone[,] *wherein the temperature ranges from above 1200° C. to approximately 1925° C.*, the method comprising the steps of packaging solid waste in sealable containers, and delivering the containers to the clinkering zone inside the vessel where the gas temperature is in excess of 1700° C.

7. *A method for disposing of solid waste in a rotary kiln of the type which produces cement, the kiln comprising a rotating, generally cylindrical vessel having first and second longitudinally opposite ends, interior walls and means for heating gases in the interior of the vessel to progressively greater temperatures from one end to the other end for processing material in the vessel, the interior of the kiln including at least two zones, a calcining zone wherein the temperature ranges from approximately 950° C. to 1200° C. and a clinkering zone wherein the temperature ranges from above 1200° C. to approximately 1925° C., the method comprising the step of delivering pre-packaged sealed containers of solid waste to that portion of the clinkering zone inside the vessel in which there is a coating of cement clinker on the interior walls of the vessel.*

* * * * *